US012332825B2

United States Patent
Srivastava et al.

(10) Patent No.: US 12,332,825 B2
(45) Date of Patent: Jun. 17, 2025

(54) APPARATUS AND METHOD FOR CONFIGURING A INTERCONNECT LINK BETWEEN CHIPLETS

(71) Applicant: QUALCOMM Incorporated, San Diego, CA (US)

(72) Inventors: Prakhar Srivastava, Lucknow (IN); Santhosh Reddy Akavaram, Hyderabad (IN); Aditya Singh Patel, Jabalpur (IN); Ravi Kumar Sepuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 18/463,852

(22) Filed: Sep. 8, 2023

(65) Prior Publication Data

US 2025/0086132 A1    Mar. 13, 2025

(51) Int. Cl.
*G06F 13/40*        (2006.01)
(52) U.S. Cl.
CPC ............................... *G06F 13/4068* (2013.01)
(58) Field of Classification Search
CPC ....................................................... H04L 67/12
See application file for complete search history.

(56) References Cited

U.S. PATENT DOCUMENTS

| 2016/0170918 | A1 | 6/2016 | Butcher et al. | |
| 2022/0237138 | A1* | 7/2022 | Lanka | G06F 13/4027 |
| 2022/0327276 | A1* | 10/2022 | Seshan | G06F 13/382 |

FOREIGN PATENT DOCUMENTS

WO    2024129255    6/2024

OTHER PUBLICATIONS

International Search Report and Written Opinion—PCT/US2024/036346—ISA/EPO—Oct. 21, 2024.
Sharma D.D., et al., "Universal Chiplet Interconnect Express (UCIe): An Open Industry Standard for Innovations With Chiplets at Package Level", IEEE Transactions on Components, Packaging and Manufacturing Technology, IEEE, USA, vol. 12, No. 9, Sep. 15, 2022, pp. 1423-1431, XP011923265, pp. 1423-142, figure 3.

\* cited by examiner

*Primary Examiner* — Henry Tsai
*Assistant Examiner* — Juanito C Borromeo
(74) *Attorney, Agent, or Firm* — Loza & Loza, LLP/Qualcomm

(57) ABSTRACT

The disclosed techniques store certain information of functional modules and lanes to optimize a die-to-die interconnect link. Based on the information, the apparatus can optimize a link width and a multi-module link configuration of the interconnect link. An integrated circuit device includes a first die, a second die, and a die-to-die (D2D) interconnect link connected between the first die and the second die. The D2D interconnect link includes a plurality of lanes grouped into a plurality of modules. The apparatus maintains a training result of the D2D interconnect link based on the training of the D2D interconnect link, the training result including one or more link configurations of the plurality of modules. The apparatus selects a link configuration of the one or more link configurations to configure the D2D interconnect link including one or more of the plurality of modules.

27 Claims, 12 Drawing Sheets

| Set | Start lane | End lane | Width |
|-----|------------|----------|-------|
| 0   | 0          | 2        | 3     |
| 1   | 4          | 11       | 8     |
| 2   | 13         | 15       | 3     |

FIG. 11

APPARATUS AND METHOD FOR CONFIGURING A INTERCONNECT LINK BETWEEN CHIPLETS

TECHNICAL FIELD

The present disclosure relates generally to integrated circuit technology and, more particularly to techniques for configuring of an interconnect link between chiplets or dies.

BACKGROUND

A computer system may include a single or multiple integrated circuits with multiple cores or processors present on one or more individual integrated circuit devices or dies. An integrated circuit device can include one or more dies, which may include various components, for example, processing cores, graphical processors, interfaces, memory, etc. Multiple integrated circuit dies may be included in the same package, and on-package interconnects can be used to connect the semiconductor dies together. In some examples, an integrated circuit die can be referred to as a chiplet. A chiplet is a functional unit that performs certain specific tasks or provides certain functionality within an integrated circuit device containing multiple chiplets or dies.

An example of a die-to-die (D2D) interconnect link is the Universal Chiplet Interconnect Express (UCIe) link. UCIe is an open, multi-protocol capable, on-package interconnect standard for connecting multiple dies (e.g., chiplets) on the same package. A UCIe link can support multiple protocols (Peripheral Component Interconnect Express (PCIe), Compute Express Link (CXL), etc.) on top of a common physical and link layer. The UCIe link can provide interoperability across a wide range of devices having different performance characteristics and requirement.

SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

Certain aspects of the disclosure relate to integrated circuit (IC) devices that include multiple chiplets or dies that are connected using a die-to-die (D2D) interconnect link.

In various aspects of the disclosure, a method of configuring a die-to-die (D2D) interconnect link, comprises: training the D2D interconnect link between a plurality of dies, the D2D interconnect link comprising a plurality of lanes grouped into a plurality of modules; maintaining a training result of the D2D interconnect link based on the training of the D2D interconnect link, the training result comprising one or more link configurations of the plurality of modules; and selecting a link configuration of the one or more link configurations to configure the D2D interconnect link including one or more of the plurality of modules.

In various aspects of the disclosure, an integrated circuit device comprises: a first die; a second die; and a die-to-die (D2D) interconnect link connected between the first die and the second die, the first die comprising: a communication interface connected to the D2D interconnect link; and one or more processors connected to the communication interface. The one or more processors are configured to: train the D2D the interconnect link between the first die and second die, the D2D interconnect link comprising a plurality of lanes grouped into a plurality of modules; maintain a training result of the D2D interconnect link based on the training of the D2D interconnect link, the training result comprising one or more link configurations of the plurality of modules; and select a link configuration of the one or more link configurations to configure the D2D interconnect link including one or more of the plurality of modules.

In various aspects of the disclosure, an integrated circuit device comprises: a die-to-die (D2D) interconnect link connected between a first die and a second die; and means for training the D2D interconnect link between a plurality of dies, the D2D interconnect link comprising a plurality of lanes grouped into a plurality of modules; means for maintaining a training result of the D2D interconnect link based on the training of the D2D interconnect link, the training result comprising one or more link configurations of the plurality of modules; and means for selecting a link configuration of the one or more link configurations to configure the D2D interconnect link including one or more of the plurality of modules.

BRIEF DESCRIPTION OF THE DRAWINGS

FIG. 11 illustrates an exemplary table for configuring a link with contiguous lanes according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

Aspects of the disclosure provides various systems, apparatuses, and techniques for optimizing a die-to-die interconnect link. In some aspects, the techniques can store certain information of working modules and lanes to optimize the interconnect link. Based on the information, the apparatus can optimize a link width and a multi-module link configuration of the interconnect link.

Figure 1:
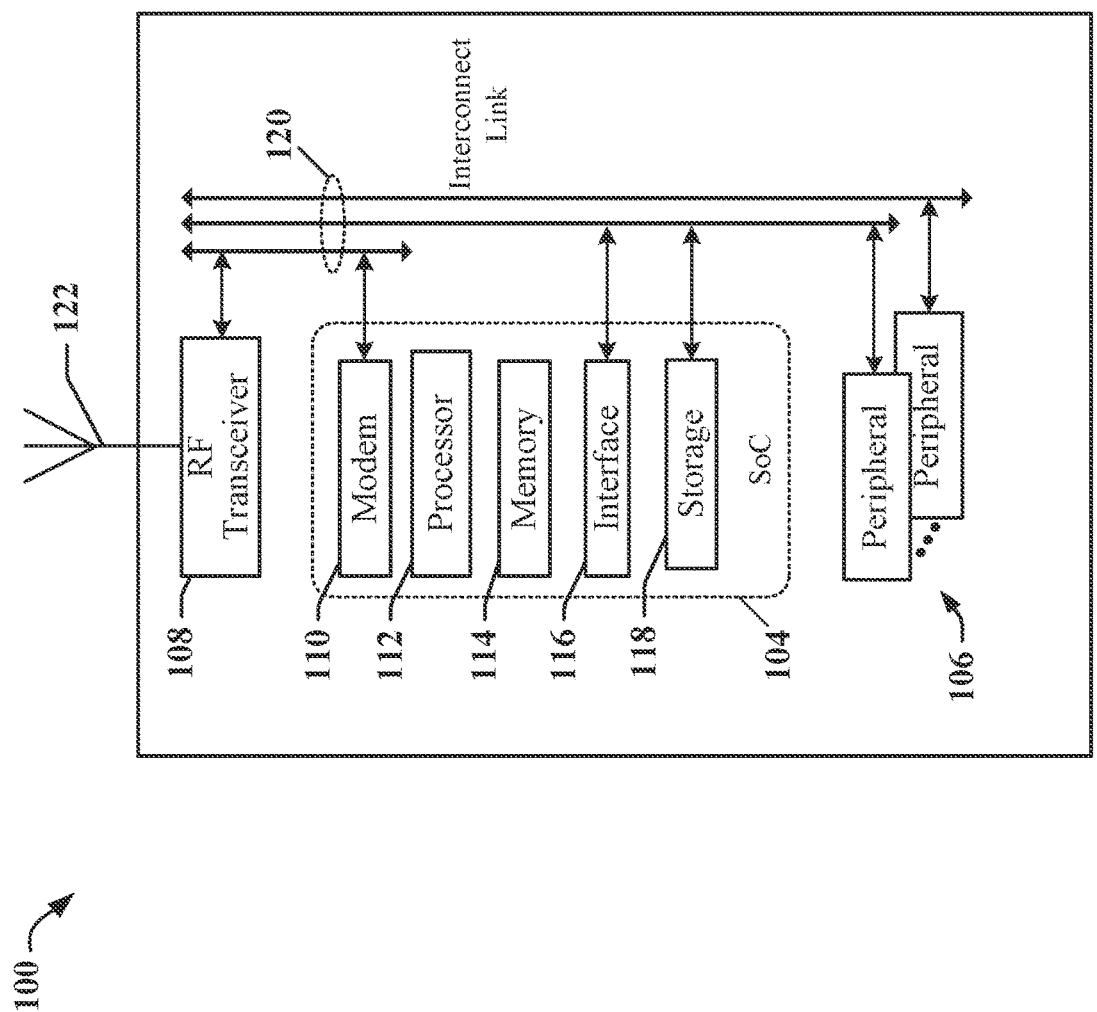
FIG. 1 illustrates an apparatus that can be implemented as an integrated circuit device including multiple components connected by interconnects according to some aspects of the disclosure.

FIG. 1 illustrates an example of an apparatus 100 that may be implemented as an integrated circuit device including multiple components or dies (e.g., chiplets) connected by one or more interconnects. In some examples, the apparatus may be enclosed within a portable or a wearable device, such as a smartwatch or a mobile device (e.g., smartphone, mobile phone, etc.). In some aspects, the apparatus 100 includes various circuitry. In various examples, the circuitry can be implemented using one or more dies (e.g., chiplets) arranged in a configuration that can be adapted for use in mobile computing, embedded computing, edge computing, etc. In one example, the apparatus 100 may be configured to support multiple communication technologies, modes, or protocols. In some aspects, the apparatus 100 can include a system-on-chip (SoC) 104, one or more peripheral devices 106, and a transceiver 108 that cooperate to enable the apparatus to communicate through an antenna 122 with a radio access network, a core access network, the Internet, and/or another network. In some examples, the apparatus 100 can communicate with another device using a device-to-device connection (e.g., Bluetooth, vehicle-to-vehicle (V2V) connection, or vehicle-to-everything (V2X) connection), or a mesh network.

In some aspects, the SoC 104 may include various circuitry, for example, one or more processors 112, one or more modems 110, on-board memory 114 (one or more memories), a communication interface circuit 116 (e.g., a bus interface), and/or other logic circuits or functions. The SoC can be controlled by an operating system that provides an application programming interface (API) layer that enables the one or more processors 112 to execute software modules or instructions residing in the on-board memory 114 and/or other processor-readable storage 118 provided on the SoC. The software modules may include instructions and data stored in the on-board memory 114 and/or processor-readable storage 118. The SoC 104 may access its on-board memory 114, the processor-readable storage 118, and/or storage external to the apparatus 100. The on-board memory 114 and the processor-readable storage 118 may include read-only memory (ROM), random-access memory (RAM), electrically erasable programmable ROM (EEPROM), flash memory, or any memory device that can be used in processing systems and computing platforms. The apparatus may include, implement, or have access to a local database or other parameter storage (e.g., tables, database, etc.) that can maintain operational parameters and other information used to configure and operate the apparatus 100 and/or the SoC 104. The local database may be implemented using registers, a database module, flash memory, magnetic media, EEPROM, soft or hard disk, or the like. The SoC 104 may also be coupled to external devices such as the antenna 122, a display, operator controls, switches or buttons, among other components.

The apparatus 100 may provide an interconnect link (e.g., interconnect link 120) that enables communication between different components (e.g., SoC 104, peripheral 106, and/or 108 RF transceiver) that can be implemented in one or more dies (e.g., chiplets). In one example, the link 120 can be a Universal Chiplet Interconnect express (UCIe) link. In one example, the SoC 104 may include communication interface circuits 116 coupled to the interconnect. Each of the interface circuits 116 may include a combination of circuits, counters, timers, control logic and other configurable circuits or modules. In one example, certain interconnect interface circuits 116 may be configured to operate in accordance with standards-defined communication specifications or protocols, for example, UCIe link. The apparatus 100 may include or control a power management function that configures and manages the operation of the apparatus 100.

In some aspects, the apparatus 100 may be included in mobile phones, tablet computers, palmtop computers, portable digital assistants (PDAs), portable game consoles, tablets, and other portable electronic devices. The various components and dies (e.g., chiplets) of the apparatus 100 may communicate with each other via one or more intra-chip communication interconnects. The apparatus 100 can be packaged in an integrated circuit (IC) package, which may be referred to as a "semiconductor package" or "chip package." The IC package typically includes a package substrate and one or more IC chips, dies, chiplets, or other electronic modules mounted to the package substrate to provide electrical connectivity to the IC chips, dies, or chiplets. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Process technology employed to manufacture semiconductor devices, including IC devices, is continually improving. Process technology includes the manufacturing methods used to make IC devices and defines transistor size, operating voltages, and switching speeds. Features that are constituent elements of circuits in an IC device may be referred as technology nodes and/or process nodes. The terms technology node, process node, and process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs. Design rules for newer process technology that use low-voltage transistors may preclude the use of higher voltage transistors supported by previous process technology generations. The unavailability of certain higher-voltage transistors may present an impediment to circuit designers for IC devices that include multiple voltage domains.

Figure 2:
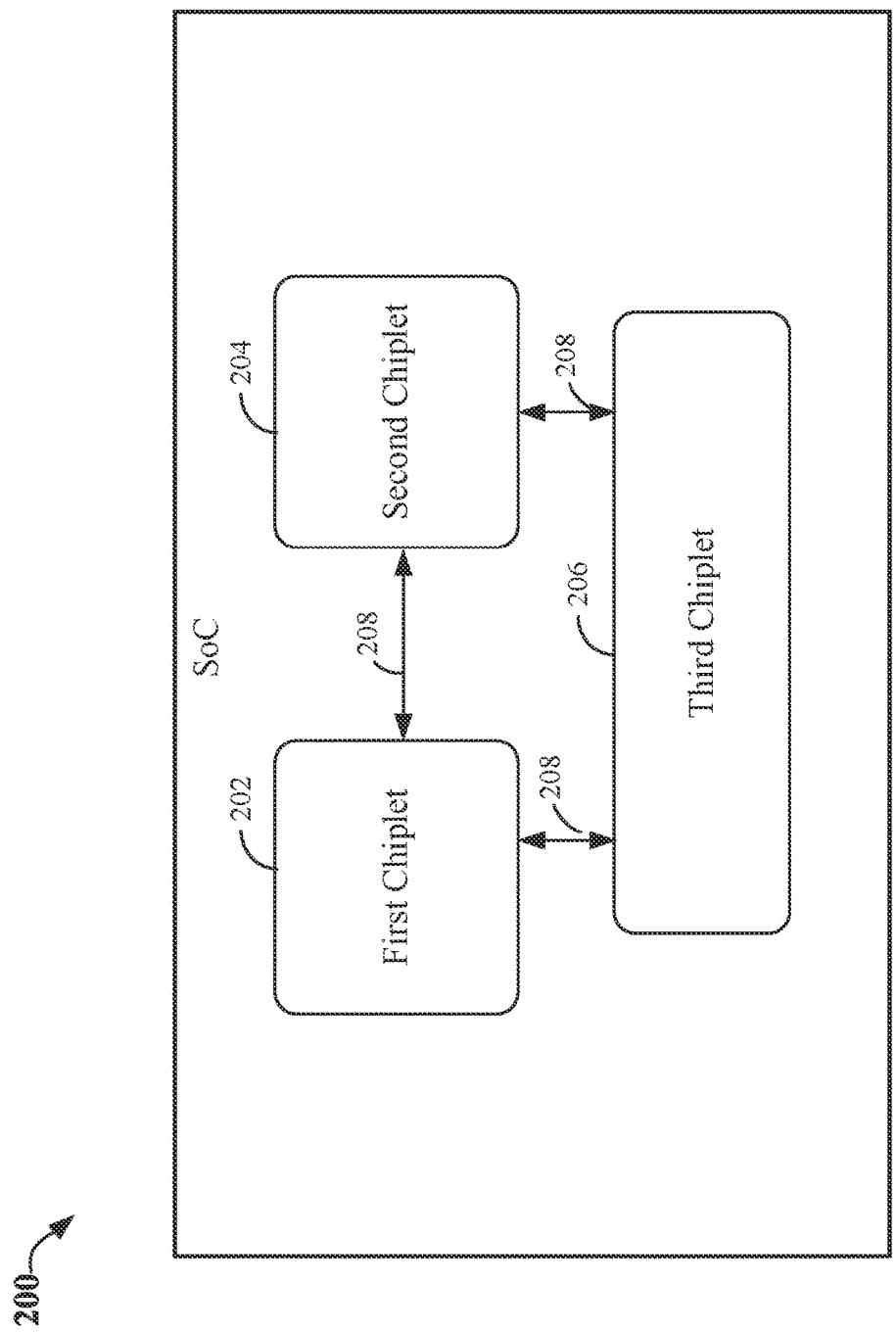
FIG. 2 illustrates certain aspects of an apparatus that can be constructed using chiplets according to some aspects of the disclosure.

In some aspects, chiplet technology can be used to address some of the performance, power, and size design requirements for complex systems used in certain mobile or wearable devices. The block diagram in FIG. 2 illustrates certain aspects of a system-on-chip (SoC) 200 that can be constructed using chiplets according to some aspects. In one example, the SoC 200 may be the SoC 104 of FIG. 1. The SoC 200 may be configured by selecting a combination of chiplets that implement certain subsystems or distinct functional elements. In the illustrated example, the SoC 200 may include multiple chiplets, for example, a first chiplet 202, a second chiplet 204, and a third chiplet 206 that are connected to each other via an interconnect link 208. Each of the chiplets 202, 204, 206 can include a communication interface (e.g., communication interface circuit 116) connected to the interconnect link 208. In other examples, the SoC 200 may include fewer or more chiplets than those shown in FIG. 2. The chiplets can provide various subsystems or functions of the SoC. In some aspects, the interconnect link 208 can be a UCIe link. Two chiplets connected by a UCIe link can be referred as a UCIe module and a UCIe module partner, respectively.

In some aspects, the SoC 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets (e.g., chiplets 202, 204, and/or 206). The chiplets included in the SoC 200 can be proprietary or may be acquired from a variety of sources. An SoC may be constructed from chiplets manufactured at different process nodes, operated at different voltages, and/or operated at different frequencies.

Figure 3:
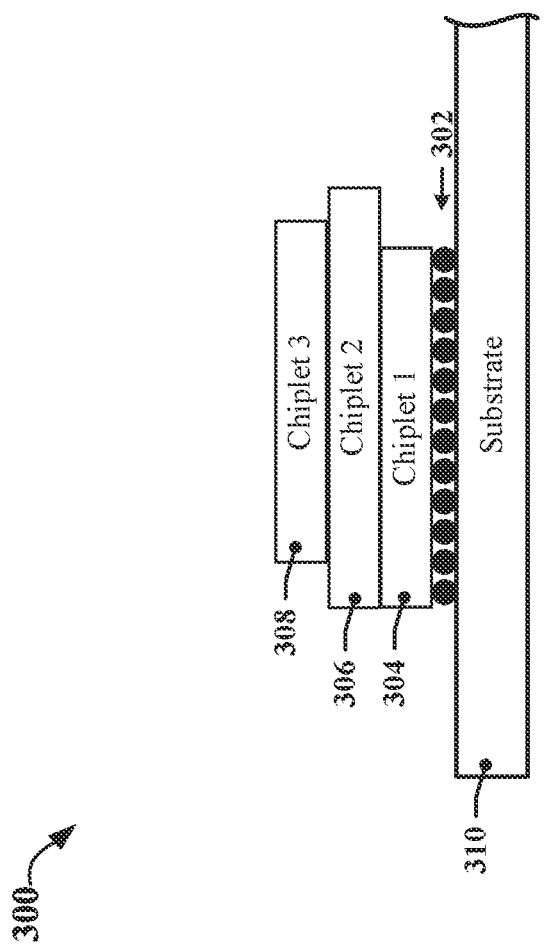
FIG. 3 illustrates an exemplary apparatus in which multiple chiplets are stacked vertically on a substrate according to some aspects of the disclosure.

FIG. 3 illustrates an example of an SoC 300 in which three exemplary chiplets 304, 306, 308 are stacked on a substrate 310. In other examples, some chiplets can be included in stacks that are deployed across the surface of the substrate 310, while other chiplets may be individually mounted on the surface of the substrate 310. In some aspects, chiplets may be mounted on the surface of the substrate using solder balls 302 (e.g., flip chip bumps) that provide electrical and/or thermal coupling between the substrate 310 and the mounted chiplets 304, 306, and 308. An interconnect structure (e.g., a UCIe link) may be formed that enables the chiplets 304, 306, 308 (e.g., in a stack of chiplets) to communicate with one another, with other chiplets mounted on the substrate 310, and with input/output structures that connect the SoC 300 with other circuits, displays, imaging sensors, and other peripherals with an apparatus. In some examples, the SoC 300 may be any of the SoCs described above in FIGS. 1 and 2.

The use of chiplets can reduce the areal size of the substrate 310 and increase three-dimensional packing density. The constituent chiplets may provide complex features and high performance within a smaller form-factor operated at lower power specifications. Moreover, each chiplet may define multiple power domains, operate at different frequencies, and different chiplets may manage power/frequency modes independently. In some instances, two or more chiplets may be operated in mutually exclusive power states.

Additionally, operating conditions for an SoC may depend on the type, number, and arrangement of chiplets included on the substrate in addition to the modes of operation defined by applications. It is necessary to consider power usage by all chiplets in the SoC in order to ensure compliance with power budgets assigned for an application or device.

The interconnect or communication link between various chiplets or dies can use a layered protocol. One example of such protocol is the UCIe protocol. Hereafter, aspects of the present disclosure will be presented using a UCIe link and protocol. However, the present disclosure is not limited to the UCIe link and protocol. In other examples, aspects of the disclosure can be implemented using any suitable interconnects and protocols.

Figure 4:
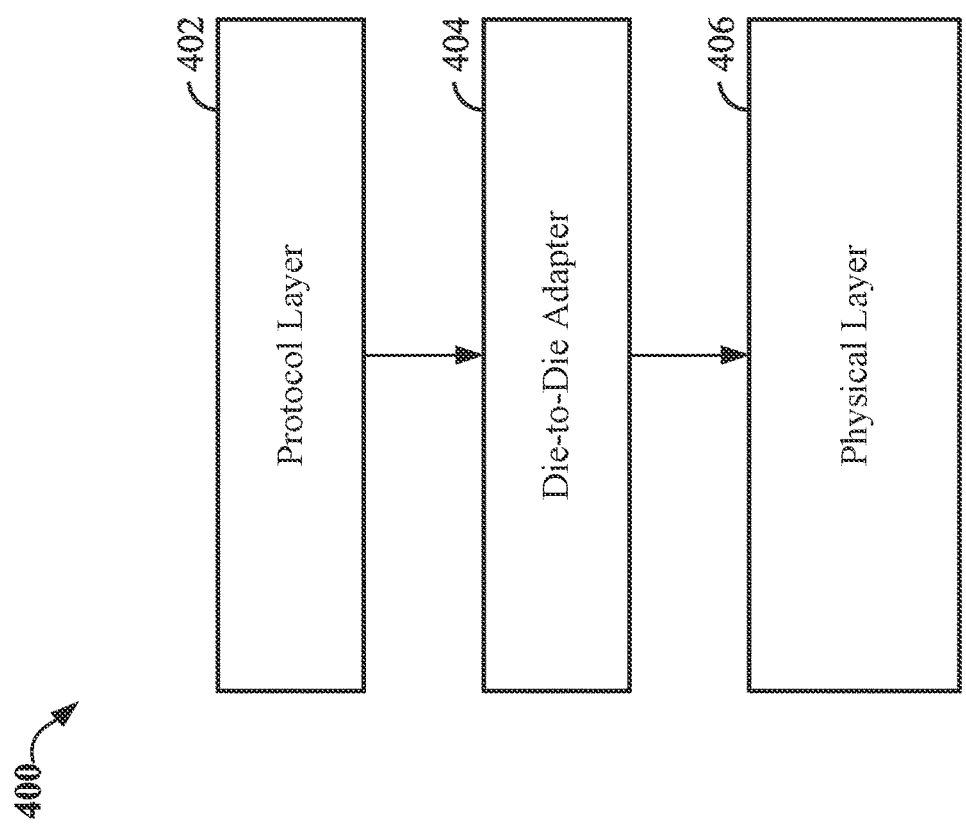
FIG. 4 illustrates exemplary Universal Chiplet Interconnect express (UCIe) protocol layers according to some aspects of the disclosure.

FIG. 4 illustrates an exemplary protocol stack 400 of a UCIe link according to some aspects of the disclosure. The protocol stack 400 includes a protocol layer 402, a die-to-die (D2D) adapter layer 404, and a physical (PHY) layer 406. In some aspects, the protocol layer may be application specific. In some examples, the protocol layer 402 can support Peripheral Component Interconnect Express (PCIe), Compute Express Link (CXL), etc. The D2D adapter layer 404 coordinates with the protocol layer 402 and the physical layer 406 to ensure successful data transfer across the UCIe link. The D2D adapter layer 404 is responsible for coordinating higher level link state machine and bring-up, protocol options related parameter exchanges with the remote link partner, and when supported, power management coordination with the remote link partner.

Figure 5:
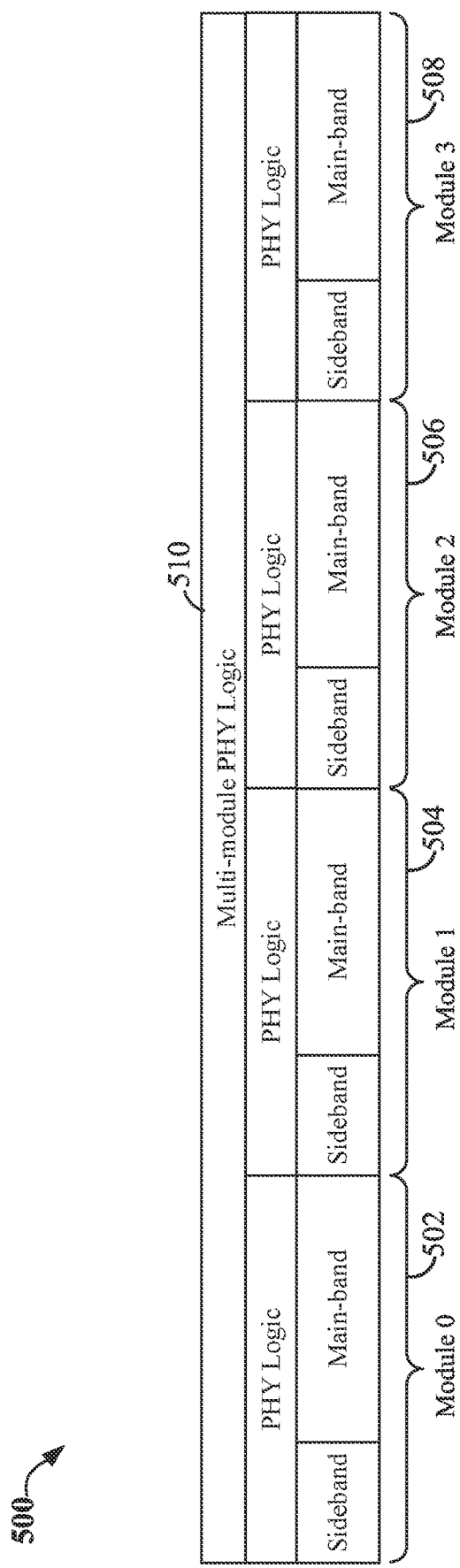
FIG. 5 illustrates a UCIe link physical layer in more detail according to some aspects of the disclosure.

FIG. 5 illustrates a UCIe link physical layer 500 in more detail according to some aspects of the disclosure. In some aspects, the physical layer 500 can be implemented at the SoC 104 (FIG. 1) using one or more components including the processor 112 and communication interface 116. In one example, the physical layer 500 may be the physical layer 460 of FIG. 4. A UCIe link can be formed by one or more modules, and each module can provide a plurality of lanes (e.g., 16 or 64 lanes in a single UCIe module). Four exemplary modules 502, 504, 506, 508 (module 0, module 1, module 2, and module 3) are shown in FIG. 5. Each module has a corresponding PHY logic, a sideband, and a main-band. Module 0 may be referred to as the first module or least significant byte (LSB) module that provides the LSB of the UCIe link. A given instance of the protocol layer 402 or D2D adapter 404 can send data over one or more modules. The sideband can be used for parameter exchanges, register accesses for debug/compliance, and coordination with a remote partner for link training and management. The sideband includes a forwarded clock pin (CLK) and a data pin (DATA) in each direction. Each module has its own set of sideband pins (CLK and DATA). In some aspects, a redundant pair of clock and data pins in each direction is provided for repair of the sideband. The main-band connection constitutes the main data path of a UCIe link or module. Each module's main-band includes a forwarded clock (FW-CLK), a data valid pin (Valid), and N lanes of data (N DATA) per module.

During link initialization and training, UCIe devices (e.g., a UCIe module and a UCIe module partner) establish a reliable communication link between the devices connected via a UCIe link. The UCIe devices negotiate and configure various parameters to ensure proper communication and data transfer. In some aspects, the Link Training and Status State Machine (LTSSM) governs the initialization and training of a UCIe link. The LTSSM transitions through various states until it reaches the active state, indicating a successfully initialized and trained UCIe link between the devices.

During link initialization and training, the UCIe devices can negotiate and agree upon the link width and speed based on their capabilities. Once the link initialization and training process is completed, the UCIe devices can start exchanging data using the established and configured communication link.

Figure 6:
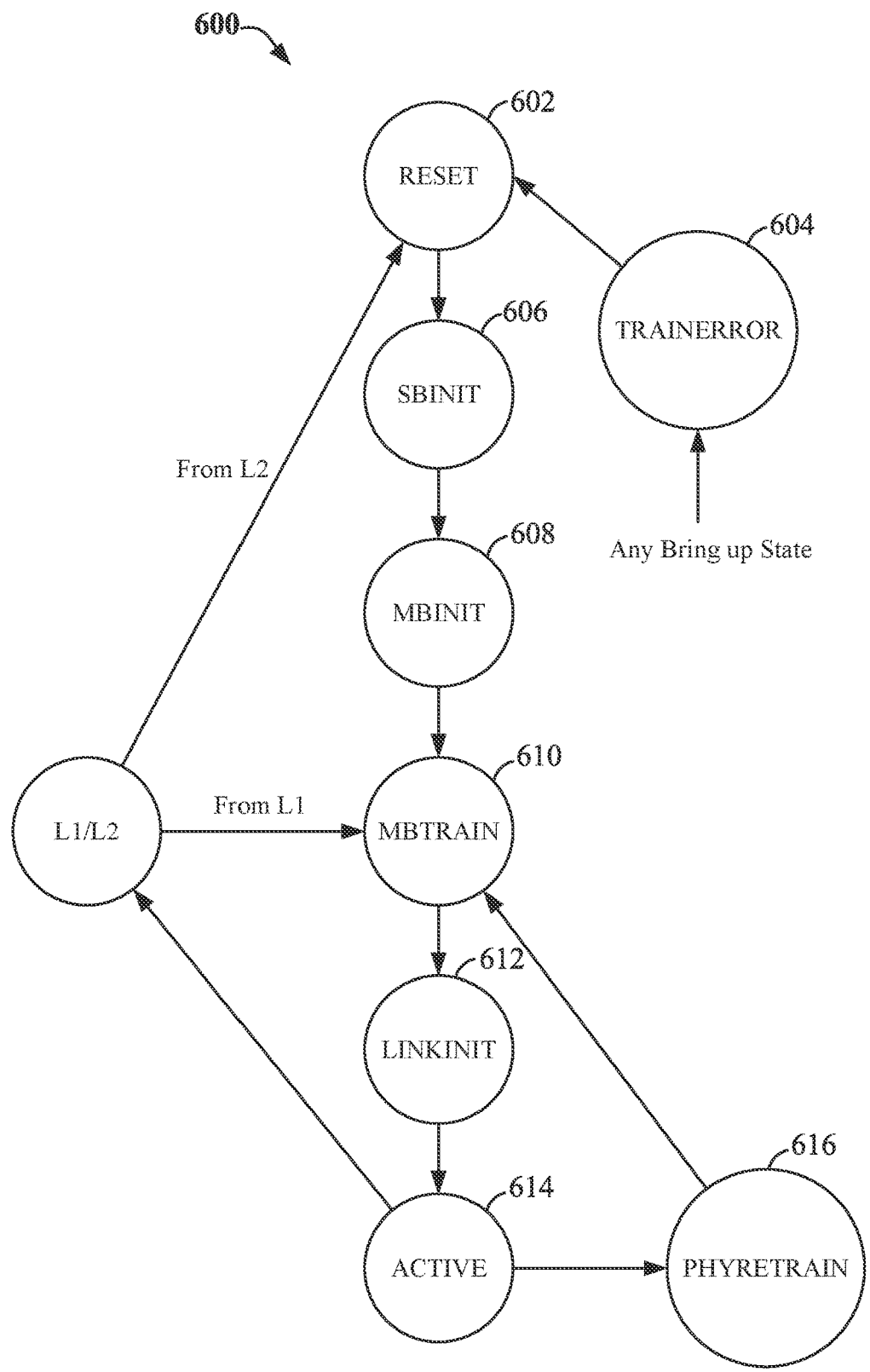
FIG. 6 illustrates exemplary states of a Link Training and Status State Machine (LTSSM) according to some aspects of the disclosure.

FIG. 6 is a diagram illustrating exemplary states of a LTSSM 600 according to some aspects of the disclosure. RESET 602 is the state following primary reset or exit from TRAINERROR 604. The TRAINERROR state is used as a transitional state due to any fatal or non-fatal events (e.g., linkerror or trainerror) that need to bring the state machine back to RESET state. Fatal events are severe errors that can result in the termination of the current transaction or the entire UCIe link. A fatal event cannot be recovered or corrected by the UCIe devices. When a fatal event occurs, the affected device or link may be disabled or reset to recover from the error state. Non-fatal events are less severe than fatal events and can often be recovered or corrected without terminating the entire UCIe link or transaction. For example, non-fatal errors can be addressed by retrying the operation or taking corrective actions.

A linkerror refers to a problem or error that occurs at the physical layer of the UCIe interconnect. It indicates a failure or disruption in the communication link between two components (e.g., chiplets or dies) connected through the UCIe link. This can be caused by various factors such as electrical noise, signal integrity issues, timing mismatches, or physical defects in the interconnect itself. A linkerror indicates that the communication channel is not functioning properly and may require troubleshooting or repair. On the other hand, a trainerror is usually related to the process of training or configuring the interconnect for optimal performance. A trainerror indicates that the training process was unsuccessful or encountered an error. It may be caused by issues with signal integrity, channel conditions, or compatibility between the transmitting and receiving components. In summary, linkerror typically refers to a physical layer issue in the interconnect, indicating a problem with the communication link, while trainerror relates to the training process and suggests difficulties in configuring the interconnect for optimal performance.

In some aspects, the TRAINERROR state can be entered from SBINIT 606 when the sideband interface needs to be repaired and from MBINIT when the main-band interface needs to be degraded or repaired. If sideband is active, a sideband handshake is performed for both devices (e.g., UCIe module and UCIe module partner) to enter TRAINERROR state from any state other than SBINIT. From TRAINERROR, the link can go through initialization and training states (SBINIT and MBINIT) again to repair and/or retrain the link if possible or needed.

SBINIT 606 is the side band initialization state where the side band can be detected, repaired (when applicable), initialized, and an out of reset message is transmitted. MBINIT 608 is a main-band initialization state where mainband (MB) initialization occurs, following sideband initialization in SBINIT. The MB can be initialized at the lowest speed. In MBINIT, the dies (e.g., chiplets) can perform on die calibration followed by interconnect repair (when applicable). In MBTRAIN 610, the main-band (e.g., data, clock, and valid signals) speed of operation can be set to the highest negotiated data rate between link partners. In MBTRAIN, die-to-die training of the main-band can be performed to center the clock with respect to data. LINKINIT 612 is the state used to exchange adapter and link management messages. ACTIVE 614 is the state in which transactions can be sent and received between link partners. L1/L2 is the power management state. PHYRETRAIN 616 is the state used to begin the retrain flow for the link during runtime.

In the current UCIe specification, each module in a multi-module link initializes and trains independently, using its sideband. For example, when two or four modules (e.g., any of modules 502, 504, 506, 508) are used, a separate multi-module PHY logic (MMPL) 510 coordinates the operations across the modules. For example, the MMPL is responsible for coordinating data transfer across multiple modules. In some aspects, the modules in a multi-module link operate at the same link width and speed. During initialization or training, if any module failed to train, the MMPL can degrade the multi-module configuration to the next permitted (degraded) configuration including module 0. Degrading a link reduces the number of modules and/or lanes included in the link. Subsequently, any differences in speed and link width between the different modules can be resolved. In some aspects, a UCIe link can include 16 lanes (logical lanes 0 to 15) in a standard packet interface. Where lane repair is not supported, resilience against faulty lanes can be provided by configuring the link to a x8 width (e.g., lanes 0-7 or lanes 8-15 which exclude the faulty lanes). For example, if one or more faulty lanes are in lane 0-7, the link can be configured to x8 width using lanes 8-15. The configuration can be done during link initialization or training.

In the current UCIe implementation of a multi-module link, a single sideband is used to send and receive sideband messages for all modules from upper layers (e.g., protocol layer 402 and D2D adapter layer 404) or messages related to raw die-to-die interface (RDI) state transitions. In this case, a device sends sideband messages on its logical LSB module's sideband interface that is always mapped to module 0. However, the current approach for degrading a multi-module link in case of module failure is inefficient, because it can only form a UCIe link starting with module 0 to map the logical sideband to module 0's sideband, without considering the maximum number of contiguous modules included in the configuration. Further, in case of a sideband failure observed on module 0 (i.e., LSB module), even when the main-band of module 0 is still functional, the multi-module link becomes unusable and the entire link requires a retraining. For example, if module 0 fails link training, the multi-module link bandwidth becomes zero and communication between the dies is lost because a functional link cannot be formed without module 0 in the current approach. In another example, when the trainings of module 0, module 2, and module 3 are successful but the training of module 1 fails, the resulted multi-module link will include only module 0 (e.g., 16 lanes in case of UCIe standard packaging) rather than a two-module link including contiguous modules module 2 and module 3 (e.g., providing 32 main-band lanes in case of standard packaging). The above described UCIe link configurations can result in significant loss in bandwidth and degradation of throughputs.

Some aspects of the disclosure provide various techniques for configuring a multi-module UCIe link with optimized bandwidth. In one aspect, a UCIe device can maintain information regarding one or more contiguous multi-module link configurations. Based on this information, the device can configure a multi-module link with the largest available link width. In some aspects, the device can remap any starting module (other than LSB module or module 0) of the selected configuration to be the logical module 0 (logical first module) of the link and remap contiguous next module (s) in the sequence. The logical module handles the higher-level functions of data transmission, including data packets, flow control, and protocol management. For example, the logical module of a UCIe link can maintain reliable and efficient communication between devices, abstracting the underlying physical layer details (e.g., physical modules 0, 1, 2 and 3 of FIG. 5) and providing a high-level interface for data exchange. Physical module numbers are the physical identifiers through which the PHY logic identifies each module while the adapter/upper layer can assign a logical module number that can be the same or different from the physical module number of the underlying module. This is similar to the case of logical and physical lane numbers assigned within a module to different lanes. By default both logical lane numbers can be the same to physical lane numbers until lane reversal is needed or a lane fault occurs. In some aspects, the device can use any of the sidebands of the modules to act as the single logical sideband for the multi-module link. These techniques will be described in more detail below with examples.

Figure 7:
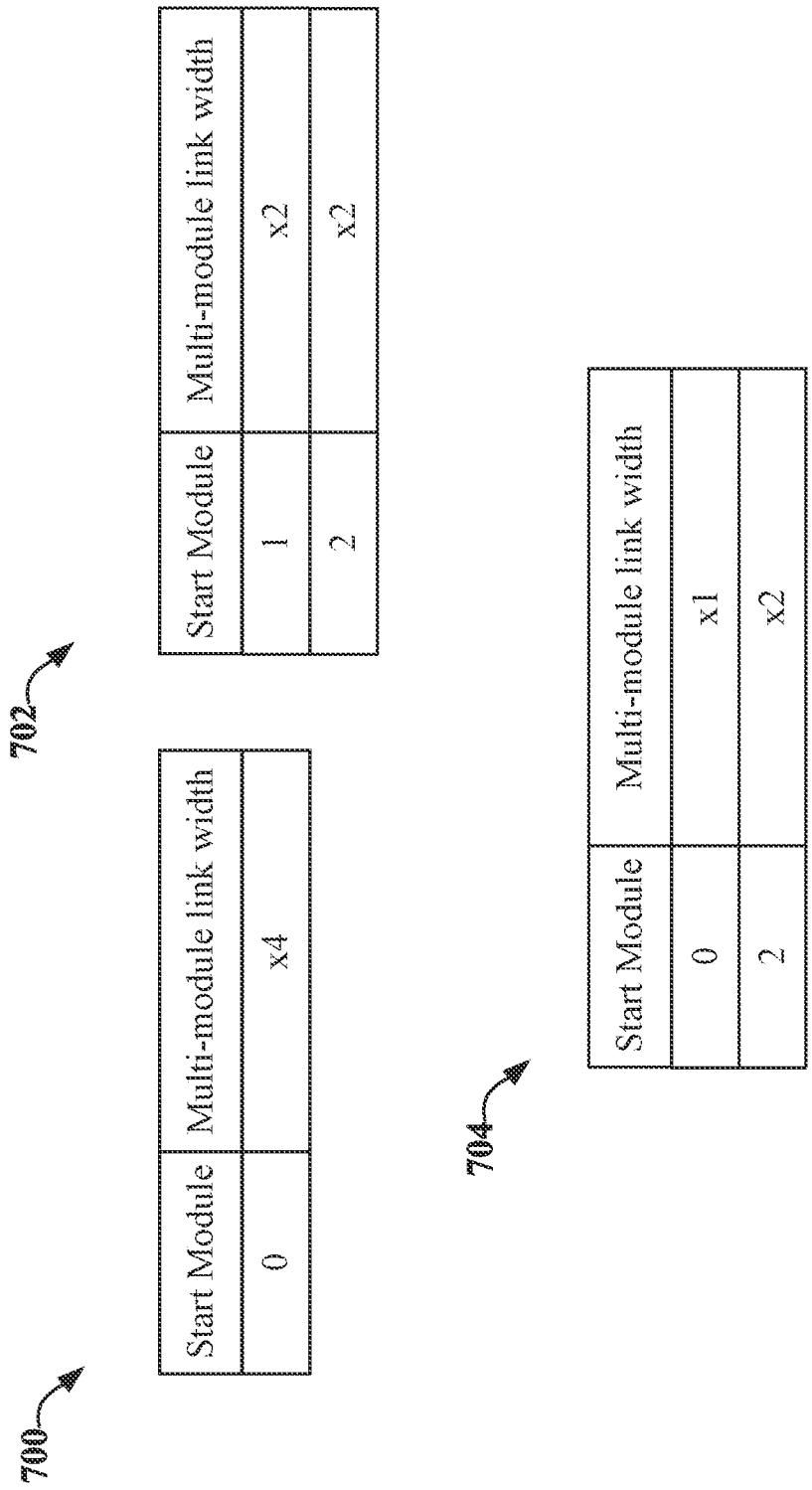
FIG. 7 illustrates exemplary tables that contain information for configuring a contiguous multi-module link according to some aspects of the disclosure.

FIG. 7 illustrates exemplary tables that contain information for configuring a contiguous multi-module link according to some aspects of the disclosure. Each table 700, 702, 704 includes start module information and multi-module link width information for a UCIe link. For example, the device can keep the training result information in the table for a multi-module link that can include up to four modules (e.g., module 0, module 1, module 2, and module 3 of FIG. 5). In some aspects, the table can be stored in a memory (e.g., memory 114 and/or storage 118 of FIG. 1) of the device. Referring to table 700, when no failure is observed while training the modules, the table indicates a single multi-link configuration with the start module (LSB module) being module 0 and the multi-module link width being x4 (i.e., 4 modules).

In another example, when failure is observed with only module 0 but module 1, module 2, and module 3 are successfully trained, table 702 can indicate a first multi-link configuration with the start module being module 1, and the multi-module link width being x2. The table can further include a second multi-link configuration with the start module being module 2, and the multi-module link width being x2. In some aspects, UCIe supports 3 configurations of a multi module link for less complexity while placing data on lanes using x1, x2 and x4 configurations.

In another example, when failure is observed with module 1 during training, table 704 can indicate two multi-link configurations. A first configuration indicates the start module being module 0, and the multi-module link width being x1. A second configuration indicates the start module being module 2, and the multi-module link width being x2. In this case, the second configuration provides the largest available link width using two contiguous modules. FIG. 7 illustrates certain examples, and it should be understood that the tables can indicate other contiguous multi-module configurations (e.g., x2, x3, . . . , etc.) depending on the training results.

Figure 8:
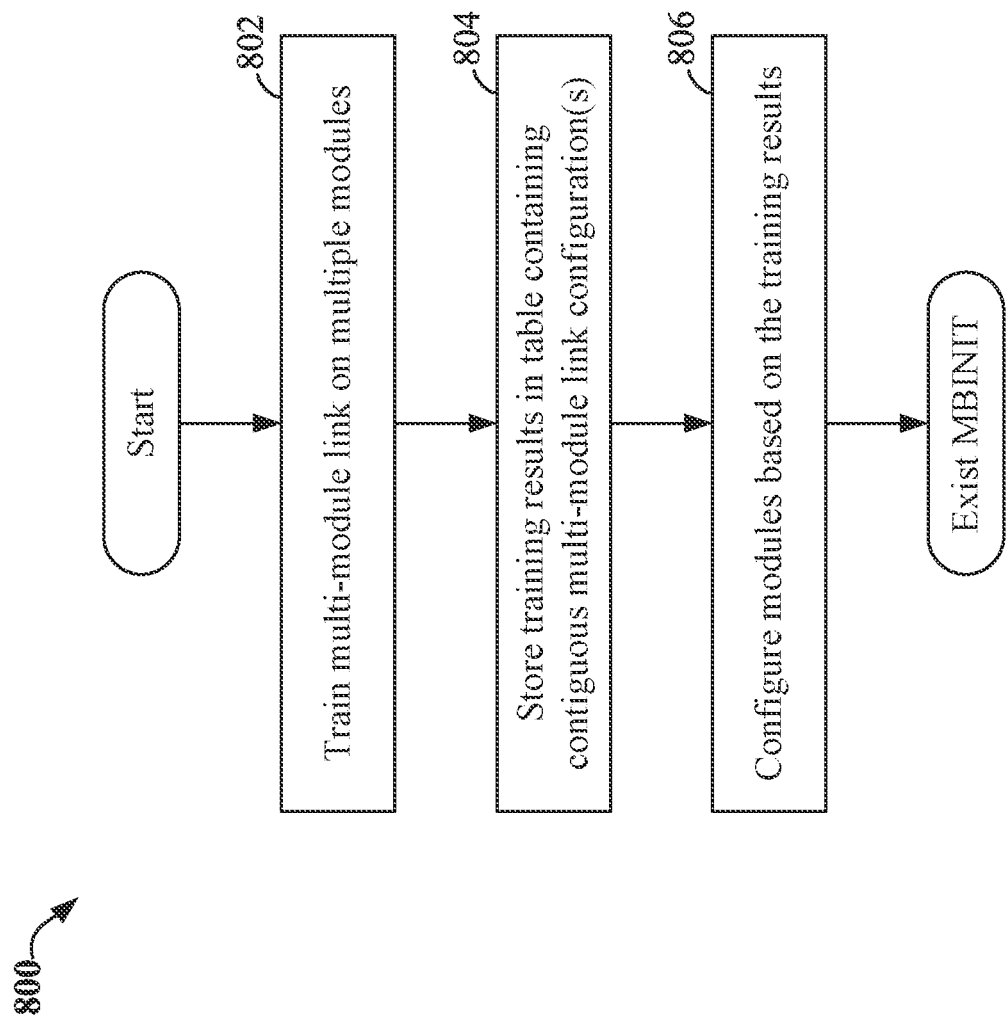
FIG. 8 is a flow chart illustrating a method of configuring a multi-module link according to some aspects of the disclosure.

FIG. 8 is a flow chart illustrating a method of configuring a multi-module UCIe link according to some aspects of the disclosure. At 802, the device can train a UCIe link in the MBTRAIN state 610. For example, the link may include four modules (e.g., module 0, module 1, module 2, and module 3 of FIG. 5). During MB training, a UCIe module and its UCIe module partner can exchange sideband messages to facilitate and coordinate the training of the MB, for example, to determine whether or not a module correctly functions at a certain data rate. Each module can report the training results to the multi-module PHY logic 510 that coordinates across the modules.

At 804, the multi-module PHY logic 510 can store the training results in a database or table. For example, the table may be similar to any of the tables described above in relation to FIG. 7 depending on the training results. The table can indicate one or more multi-module link configurations. The table or information contained in the table can be stored in the memory of the device, for example, memory 114 and/or storage 118.

At 806, the multi-module PHY logic can configure the modules based on the training results received from the module. In some aspects, the multi-module PHY logic can configure the multi-module link with a largest available link width based on the training results (e.g., stored in a table). In some aspects, the device (e.g., multi-module PHY logic) can remap the starting module (LSB module or module 0) of the selected configuration to be logical module 0 and remap contiguous module(s) in sequence. In some aspects, the device can use any of the sidebands of the modules to act as the logical single sideband for the multi-module link.

Figure 9:
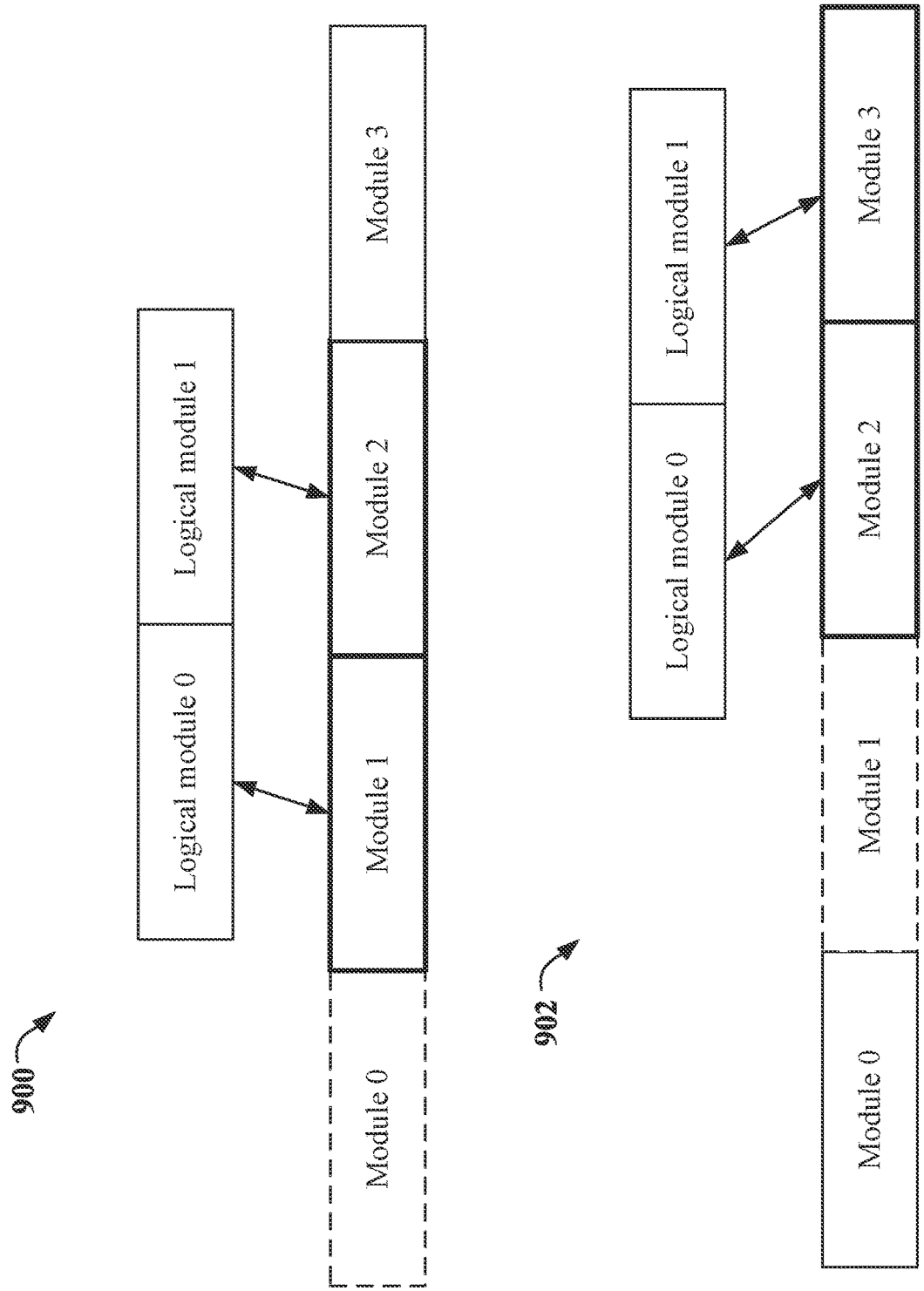
FIG. 9 illustrates examples of logical module mapping of a multi-module link according to some aspects of the disclosure.

FIG. 9 illustrates two examples of logical module mapping of a multi-module link according to some aspects of the disclosure. In a first example 900, the training of module 0 fails but module 1, module 2, and module 3 are successful. In this case, the table will have two multi-module configurations like that shown in table 702. Either configuration can provide the largest contiguous multi-module link (x2 contiguous modules). For example, the device can configure a multi-module link with module 1 (starting module) and module 2 (e.g., providing x32 main-band lanes). In this case, logical module 0 can be mapped to module 1, and logical module 1 can be mapped to module 2. In another example, the device can configure a multi-module link with module 2 (starting module) and module 3.

In another example 902, the training of module 0, module 2, and module 3 are successful but module 1 fails. In this case, the table will have two multi-module configurations like that shown in table 704. Therefore, the device can configure a multi-module link with module 2 (starting module) and module 3 (offering x32 main-band lane). In this case, logical module 0 can be mapped to module 2, and logical module 1 can be mapped to module 3.

In some aspects, the above-described techniques can be implemented in a LINKSPEED substate of the MBTRAIN state 610 (see FIG. 6). In MBTRAIN.LINKSPEED substate, a UCIe module can exit to the LINKINIT state 612 if the module is trained successfully, otherwise, the UCIe module can go to a repair substate or a speed idle substate. In the speed idle substate, the module can change its data rate or link speed. In the repair substate, the module can apply repair and/or link width degrade procedures. If lane repair is possible, the UCIe module can apply the repair on its lanes and send a repair sideband message to the UCIe module partner. In response, the module partner applies repair and responds with a repair sideband message once the required repair is applied.

Figure 10:
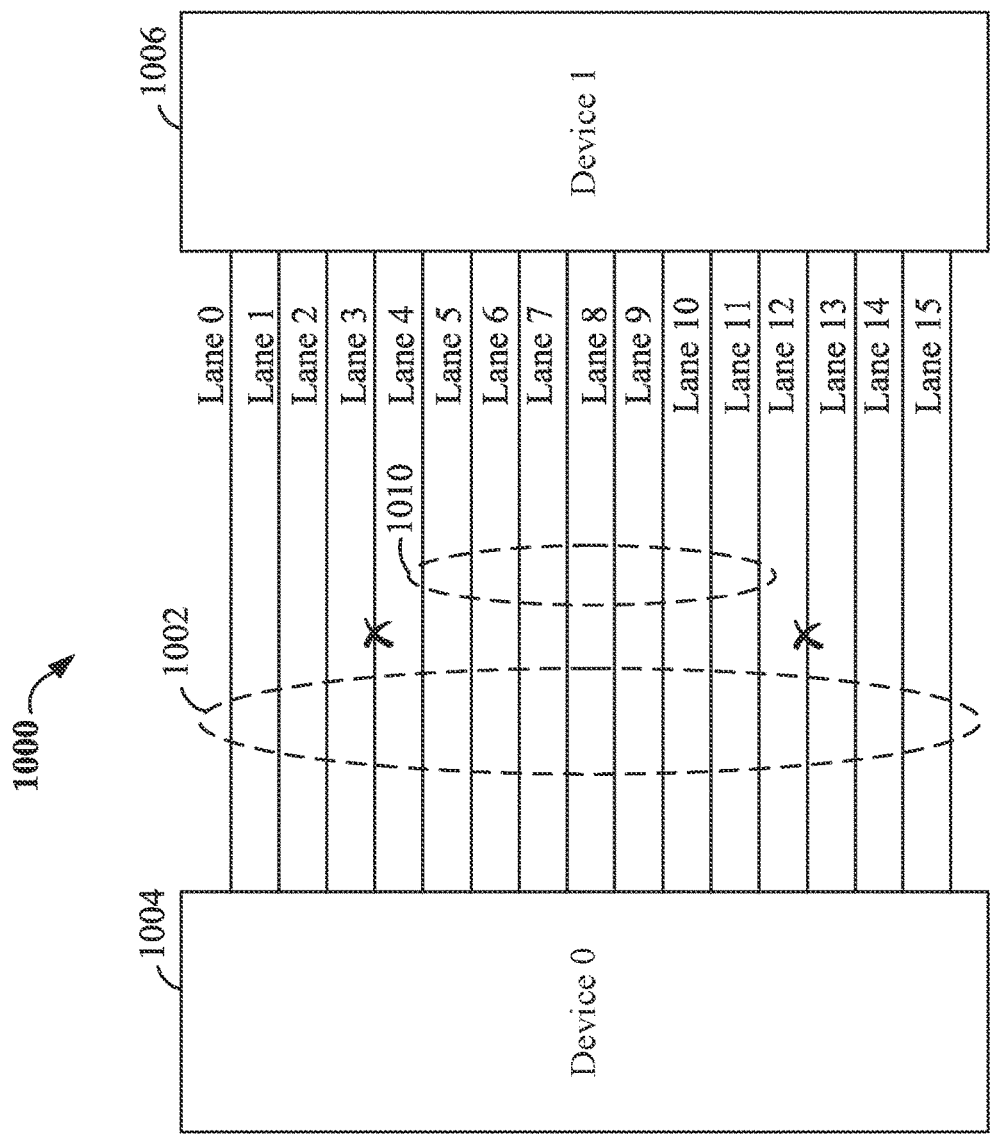
FIG. 10 illustrates an exemplary UCIe link according to some aspects of the disclosure.

FIG. 10 illustrates an exemplary UCIe link 1000 according to some aspects of the disclosure. The link 1000 has a plurality of lanes 1002 connecting two devices. In one example, the link can have a link width of x16 including lines 0 through 15 that connect a first device 1004 (e.g., device 0) with a second device 1006 (e.g., device 1). In some aspects, the devices 1004 and 1006 may be UCIe modules (e.g., a UCIe module and a UCIe module partner). In other examples, the link 1000 may have fewer or more than 16 lanes. In one example, the plurality of lanes 1002 belong to a single physical module (e.g., module 0, 1, 2, or 3 of FIG.

5). In some aspects, the link 1000 may be any of the UCIe links described above in relation to FIGS. 1-9.

In some aspects, when one or more lanes of the link 1000 encounter errors, the devices 1004, 1006 can degrade the link to include fewer than all lanes (e.g., sixteen lanes), for example, eight lanes (e.g., lanes 0-7 or lanes 8-15). The modules can exchange sideband messages to coordinate the process for degrading the link. In one example, if one or more faulty lanes are present among lanes 0 through 7, the link can be degraded to x8 width using only lanes 8 through 15. Similarly, if one or more faulty lanes are present in lanes 8 through 15, the link can be degraded to x8 width using only lanes 0 to 7. The reconfiguration can be done during link initialization or retraining, and transmitters of the disabled lanes can go to high impedance (hi-Z) and receivers are disabled.

In some aspects, the degraded link can include any contiguous functional lanes (e.g., eight lanes (x8 width)), not limited to any particular group of lanes. For example, the lanes 1002 can be grouped into a first group including lane 0 through lane 7, and a second group including lane 8 through lane 15. In other examples, the lanes may be grouped into more than two groups. In one example, faulty lanes (e.g., lane 3 and lane 12 in FIG. 10) can be present in both groups of lanes. In this case, the link can be degraded to a reduced link width (e.g., x8 link width) including lanes 1010 (e.g., lane 4 through lane 11) from both groups. Therefore, the link can remain functioning as long as a predetermined number (e.g., x8) of contiguous functional lanes are available.

Figure 11:
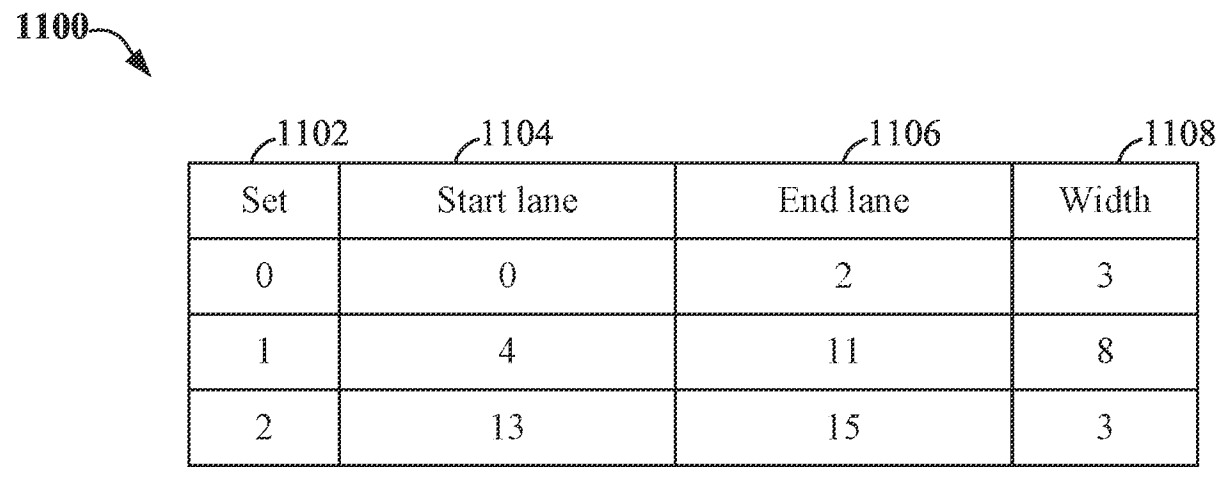

In some aspects, the device can maintain information on contiguous functional lanes according to some aspects of the disclosure. FIG. 11 illustrates an exemplary contiguous lanes table 1100 that stores information on contiguous functional lanes. For example, table 1100 stores one or more sets 1102 of contiguous functional lanes information. For example, the table stores a start lane pointer 1104 and an end lane pointer 1106 for each set of contiguous functional lanes (available configurations). Each set includes contiguous lanes between a lane identified by the start lane pointer 1104 and a lane identified by the end lane pointer 1106, inclusive. In this example, the table 1100 stores three sets of contiguous functional lanes corresponding to a scenario where lane 3 and lane 12 are faulty as shown in FIG. 10. Set 0 includes lane 0 through lane 2 as indicated by the start lane pointer and end lane pointer. Set 1 includes lane 4 through lane 11 as indicated by the start lane pointer and end lane pointer. Set 2 includes lane 13 through lane 15 as indicated by the start lane pointer and end lane pointer. In this example, set 1 provides the maximum link width. In some aspects, the table 1100 can be stored in one or more memories (e.g., memory 114 and/or storage 118 of FIG. 1). In some examples, the table 1100 may optionally include link width information 1108 for each set of contiguous lanes.

Figure 12:
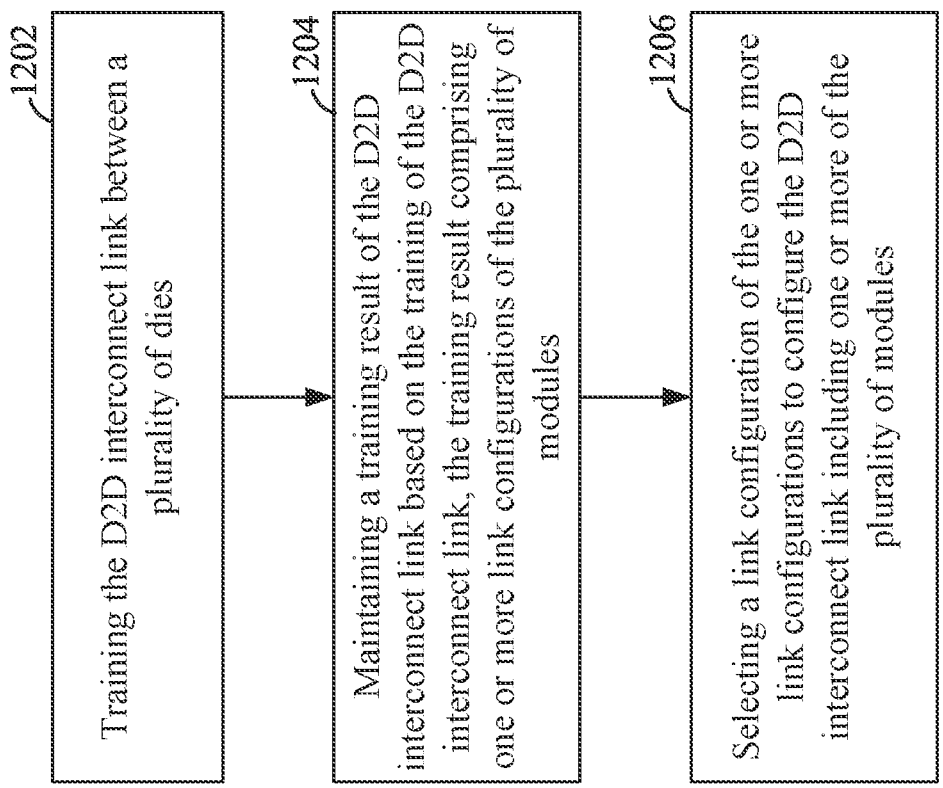
FIG. 12 is a flow chart illustrating a method for configuring a D2D interconnect link based on contiguous link information according to some aspects of the disclosure.

FIG. 12 is a flow chart illustrating a method 1200 for configuring a D2D interconnect link based on contiguous link information according to some aspects of the disclosure. For example, the method 1200 can be used by a UCIe device to configure a UCIe link using the contiguous link information stored in table 1100 described above.

At 1202, a device can train a D2D interconnect link between a plurality of dies. For example, the device can be a UCIe device as described above in relation to FIGS. 1-11. The D2D interconnect link can be a UCIe link between a plurality of chiplets (e.g., chiplets 202, 204, and/or 206). The UCIe link can include a plurality of modules (e.g., module 0, module 1, module 2, and module 3) that can be used for establishing a UCIe link. In one example, the processor 112 can provide a means to train the D2D interconnect link according to the Link Training and Status State Machine (LTSSM) 600 of FIG. 6.

At 1204, the device can maintain a training result of the D2D interconnect link based on the training of the D2D interconnect link. The training result includes one or more link configurations of the plurality of modules. In one example, the device can maintain the training result in a table similar to the tables 700, 702, 704 described above in relation to FIG. 7. The table can include start module information and multi-module link width information for a UCIe link. Each configuration in the table can provide a link configuration with a certain link width including one or more modules. In one example, the processor 112 can provide a means to maintain the training result, for example, in a memory (e.g., memory 114 and/or 118 of FIG. 1).

At 1206, the device can select a link configuration of the one or more link configurations to configure the D2D interconnect link including one or more of the plurality of modules. In one example, the processor 112 can provide a means to select the link configuration from the memory 114 and/or storage 118.

In one configuration, the apparatus 100 includes the various means for performing the processes and techniques described above in FIG. 12. The aforementioned means may be the processor(s) 112 in which the invention resides shown in FIG. 1 configured to perform the functions recited by the aforementioned means. In another aspect, the aforementioned means may be a circuit or any apparatus configured to perform the functions recited by the aforementioned means.

Of course, in the above examples, the processor 112 is merely provided as an example, and other means for carrying out the described functions may be included within various aspects of the present disclosure, including but not limited to the instructions stored in a computer-readable storage medium (e.g., storage 118 of FIG. 1), or any other suitable apparatus or means described in any one of the FIGS. 1-11, and utilizing, for example, the processes and/or algorithms described herein in relation to FIGS. 1-11.

Using the above-described techniques, a D2D interconnect link (e.g., UCIe link) can be configured to provide the highest available bandwidth that can be achieved from the available hardware resources within each module as well as the link. The techniques can increase the number of active lanes in case of a module training failure and hence increase the throughputs significantly. The disclosure techniques can avoid the need for link retraining in case of sideband failure of module 0 (LSB module) and thus prevents the link bandwidth from going to zero. Furthermore, the disclosed techniques significantly reduce power consumed in link retraining. The techniques can enhance link robustness by providing the best available bandwidth in the case when the link width needs to be reduced due to one or more failed lanes even when the failed lanes are in different lane groups. Therefore, loss of bandwidth of functional lanes due to any lane corruption or failure can be reduced significantly.

Some implementation examples are described in the following numbered clauses:

A method of configuring a die-to-die (D2D) interconnect link, comprising: training the D2D interconnect link between a plurality of dies, the D2D interconnect link comprising a plurality of lanes grouped into a plurality of modules; maintaining a training result of the D2D interconnect link based on the training of the D2D interconnect link, the training result comprising one or more link configurations of the plurality of modules; and selecting a link configuration of the one or more link configurations to configure the D2D interconnect link including one or more of the plurality of modules.

2. The method of clause 1, wherein the training result indicates one or more available configurations of the plurality of modules.

3. The method of clause 2, wherein each of the one or more available configurations comprises start module information and link width information of the D2D interconnect link using one or more of the plurality of modules.

4. The method of clause 2 or 3, wherein the selected link configuration comprises a plurality of contiguous modules with a maximum width among the one or more available configurations.

5. The method of clause 4, wherein the plurality of contiguous modules exclude a least significant byte module among the plurality of modules, in response to the least significant byte module not being included in the selected link configuration.

6. The method of clause 5, further comprising: mapping a first logical module to a first module of the plurality of contiguous modules, the first logical module configured to abstract one or more of the plurality of modules.

7. The method of clause 1, 2, or 3, wherein the D2D interconnect link comprises a single logical sideband mapped to a sideband of any of the plurality of modules, excluding a least significant byte module.

8. The method of clause 1, 2, or 3, wherein the training result indicates a plurality of faulty lanes corresponding to a single module of the plurality of modules, the method further comprising: configuring a plurality of contiguous functional lanes.

9. The method of clause 8, wherein each of one or more available configurations of the plurality of modules comprises start lane information and link width information of the D2D interconnect link using one or more of the plurality of lanes corresponding to a single module of the plurality of modules.

10. The method of clause 9, wherein the plurality of contiguous functional lanes correspond to a single module of the plurality of modules with a maximum link width among the one or more available configurations.

11. An integrated circuit device comprising: a first die; a second die; and a die-to-die (D2D) interconnect link connected between the first die and the second die, the first die comprising: a communication interface connected to the D2D interconnect link; and one or more processors connected to the communication interface, the one or more processors being configured to: train the D2D the interconnect link between the first die and second die, the D2D interconnect link comprising a plurality of lanes grouped into a plurality of modules; maintain a training result of the D2D interconnect link based on the training of the D2D interconnect link, the training result comprising one or more link configurations of the plurality of modules; and select a link configuration of the one or more link configurations to configure the D2D interconnect link including one or more of the plurality of modules.

12. The integrated circuit device of clause 11, wherein the training result indicates one or more available configurations of the plurality of modules.

13. The integrated circuit device of clause 12, wherein each of the one or more available configurations comprises start module information and link width information of the D2D interconnect link using one or more of the plurality of modules.

14. The integrated circuit device of clause 12 or 13, wherein the selected link configuration comprises a plurality of contiguous modules with a maximum width among the one or more available configurations.

15. The integrated circuit device of clause 14, wherein the plurality of contiguous modules exclude a least significant byte module among the plurality of modules, in response to the least significant byte module not being included in the selected link configuration.

16. The integrated circuit device of clause 15, wherein the one or more processors are configured to: map a first logical module to a first module of the plurality of contiguous modules, the first logical module configured to abstract one or more of the plurality of modules.

17. The integrated circuit device of clause 11, 12, or 13, wherein the D2D interconnect link comprises a single logical sideband mapped to a sideband of any of the plurality of modules, excluding a least significant byte module.

18. The integrated circuit device of clause 11, 12, or 13, wherein the training result indicates a plurality of faulty lanes corresponding to a single module of the plurality of modules, wherein the one or more processors are further configured to: configure a plurality of contiguous functional lanes.

19. The integrated circuit device of clause 18, wherein each of one or more available configurations of the plurality of modules comprises start lane information and link width information of the D2D interconnect link using one or more of the plurality of lanes corresponding to a single module of the plurality of modules.

20. The integrated circuit device of clause 19, wherein the plurality of contiguous functional lanes correspond to a single module of the plurality of modules with a maximum link width among the one or more available configurations.

21. An integrated circuit device comprising: a die-to-die (D2D) interconnect link connected between a first die and a second die; and means for training the D2D interconnect link between a plurality of dies, the D2D interconnect link comprising a plurality of lanes grouped into a plurality of modules; means for maintaining a training result of the D2D interconnect link based on the training of the D2D interconnect link, the training result comprising one or more link configurations of the plurality of modules; and means for selecting a link configuration of the one or more link configurations to configure the D2D interconnect link including one or more of the plurality of modules.

22. The integrated circuit device of clause 21, wherein the training result indicates one or more available configurations of the plurality of modules.

23. The integrated circuit device of clause 22, wherein each of the one or more available configurations comprises start module information and link width information of the D2D interconnect link using one or more of the plurality of modules.

24. The integrated circuit device of clause 22 or 23, wherein the selected link configuration comprises a plurality of contiguous modules with a maximum width among the one or more available configurations.

25. The integrated circuit device of clause 24, wherein the plurality of contiguous modules exclude a least significant byte module among the plurality of modules, in response to the least significant byte module not being included in the selected link configuration.

26. The integrated circuit device of clause 25, further comprising:

means for mapping a first logical module to a first module of the plurality of contiguous modules, the first logical module configured to abstract one or more of the plurality of modules.

27. The integrated circuit device of clause 21, 22, or 23, wherein the D2D interconnect link comprises a single logical sideband mapped to a sideband of any of the plurality of modules, excluding a least significant byte module.

28. The integrated circuit device of clause 21, 22, or 23, wherein the training result indicates a plurality of faulty lanes corresponding to a single module of the plurality of modules, the integrated circuit device further comprising: means for configuring a plurality of contiguous functional lanes.

29. The integrated circuit device of clause 28, wherein each of one or more available configurations of the plurality of modules comprises start lane information and link width information of the D2D interconnect link using one or more of the plurality of lanes corresponding to a single module of the plurality of modules.

30. The integrated circuit device of clause 29, wherein the plurality of contiguous functional lanes correspond to a single module of the plurality of modules with a maximum link width among the one or more available configurations.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

What is claimed is:

1. A method of configuring a die-to-die (D2D) interconnect link, comprising:

training the D2D interconnect link between a plurality of dies, the D2D interconnect link comprising a plurality of lanes grouped into a plurality of modules;

maintaining a training result of the D2D interconnect link based on the training of the D2D interconnect link, the training result comprising one or more available link configurations of the plurality of modules, at least one of the one or more available link configurations excluding a least significant byte module among the plurality of modules; and selecting a link configuration of the one or more available link configurations to configure the D2D interconnect link including one or more of the plurality of modules.

2. The method of claim 1, wherein each of the one or more available link configurations comprises start module information and link width information of the D2D interconnect link using one or more of the plurality of modules.

3. The method of claim 1, wherein the selected link configuration comprises a plurality of contiguous modules with a maximum width among the one or more available link configurations.

4. The method of claim 3, wherein the plurality of contiguous modules exclude the least significant byte module among the plurality of modules, in response to the least significant byte module not being included in the selected link configuration.

5. The method of claim 4, further comprising:

mapping a first logical module to a first module of the plurality of contiguous modules, the first logical module configured to abstract one or more of the plurality of modules.

6. The method of claim 1, wherein the D2D interconnect link comprises a single logical sideband mapped to a sideband of any of the plurality of modules, excluding the least significant byte module.

7. The method of claim 1, wherein the training result indicates a plurality of faulty lanes corresponding to a single module of the plurality of modules, the method further comprising:

configuring a plurality of contiguous functional lanes.

8. The method of claim 7, wherein each of one or more available configurations of the plurality of modules comprises start lane information and link width information of the D2D interconnect link using one or more of the plurality of lanes corresponding to a single module of the plurality of modules.

9. The method of claim 8, wherein the plurality of contiguous functional lanes correspond to a single module of the plurality of modules with a maximum link width among the one or more available configurations.

10. An integrated circuit device comprising:

a first die;

a second die; and a die-to-die (D2D) interconnect link connected between the first die and the second die, the first die comprising:

a communication interface connected to the D2D interconnect link; and one or more processors connected to the communication interface, the one or more processors being configured to:

train the D2D the interconnect link between the first die and second die, the D2D interconnect link comprising a plurality of lanes grouped into a plurality of modules;

maintain a training result of the D2D interconnect link based on the training of the D2D interconnect link, the training result comprising one or more available link configurations of the plurality of modules, at least one of the one or more available link configurations excluding a least significant byte module among the plurality of modules; and select a link configuration of the one or more available link configurations to configure the D2D interconnect link including one or more of the plurality of modules.

11. The integrated circuit device of claim 10, wherein each of the one or more available link configurations comprises start module information and link width information of the D2D interconnect link using one or more of the plurality of modules.

12. The integrated circuit device of claim 10, wherein the selected link configuration comprises a plurality of contiguous modules with a maximum width among the one or more available link configurations.

13. The integrated circuit device of claim 12, wherein the plurality of contiguous modules exclude the least significant byte module among the plurality of modules, in response to the least significant byte module not being included in the selected link configuration.

14. The integrated circuit device of claim 13, wherein the one or more processors are configured to:
   map a first logical module to a first module of the plurality of contiguous modules, the first logical module configured to abstract one or more of the plurality of modules.

15. The integrated circuit device of claim 10, wherein the D2D interconnect link comprises a single logical sideband mapped to a sideband of any of the plurality of modules, excluding the least significant byte module.

16. The integrated circuit device of claim 10, wherein the training result indicates a plurality of faulty lanes corresponding to a single module of the plurality of modules,
   wherein the one or more processors are further configured to:
   configure a plurality of contiguous functional lanes.

17. The integrated circuit device of claim 16, wherein each of one or more available configurations of the plurality of modules comprises start lane information and link width information of the D2D interconnect link using one or more of the plurality of lanes corresponding to a single module of the plurality of modules.

18. The integrated circuit device of claim 17, wherein the plurality of contiguous functional lanes correspond to a single module of the plurality of modules with a maximum link width among the one or more available configurations.

19. An integrated circuit device comprising:
   a die-to-die (D2D) interconnect link connected between a first die and a second die; and
   means for training the D2D interconnect link between a plurality of dies, the D2D interconnect link comprising a plurality of lanes grouped into a plurality of modules;

means for maintaining a training result of the D2D interconnect link based on the training of the D2D interconnect link, the training result comprising one or more available link configurations of the plurality of modules, at least one of the one or more available link configurations excluding a least significant byte module among the plurality of modules; and means for selecting a link configuration of the one or more available link configurations to configure the D2D interconnect link including one or more of the plurality of modules.

20. The integrated circuit device of claim 19, wherein each of the one or more available link configurations comprises start module information and link width information of the D2D interconnect link using one or more of the plurality of modules.

21. The integrated circuit device of claim 19, wherein the selected link configuration comprises a plurality of contiguous modules with a maximum width among the one or more available link configurations.

22. The integrated circuit device of claim 21, wherein the plurality of contiguous modules exclude the least significant byte module among the plurality of modules, in response to the least significant byte module not being included in the selected link configuration.

23. The integrated circuit device of claim 22, further comprising:
   means for mapping a first logical module to a first module of the plurality of contiguous modules, the first logical module configured to abstract one or more of the plurality of modules.

24. The integrated circuit device of claim 19, wherein the D2D interconnect link comprises a single logical sideband mapped to a sideband of any of the plurality of modules, excluding the least significant byte module.

25. The integrated circuit device of claim 19, wherein the training result indicates a plurality of faulty lanes corresponding to a single module of the plurality of modules, the integrated circuit device further comprising:
   means for configuring a plurality of contiguous functional lanes.

26. The integrated circuit device of claim 25, wherein each of one or more available configurations of the plurality of modules comprises start lane information and link width information of the D2D interconnect link using one or more of the plurality of lanes corresponding to a single module of the plurality of modules.

27. The integrated circuit device of claim 26, wherein the plurality of contiguous functional lanes correspond to a single module of the plurality of modules with a maximum link width among the one or more available configurations.

* * * * *